US008417996B2

(12) United States Patent
Anand et al.

(10) Patent No.: US 8,417,996 B2
(45) Date of Patent: Apr. 9, 2013

(54) FACADE FOR BUSINESS RISK MINIMIZATION IN CHANGE ADMINISTRATION VIA RISK ESTIMATION AND MISTAKE IDENTIFICATION BY TICKET ANALYSIS

(75) Inventors: Vishal Anand, Bihar (IN); Manish Gupta, New Delhi (IN); Venkateswara Reddy Madduri, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/762,471

(22) Filed: Apr. 19, 2010

(65) Prior Publication Data

US 2011/0258478 A1    Oct. 20, 2011

(51) Int. Cl.
    *G06F 11/30* (2006.01)
(52) U.S. Cl. .............................. 714/26; 714/46; 709/221
(58) Field of Classification Search ................... 714/26, 714/46
    See application file for complete search history.

(56) References Cited

U.S. PATENT DOCUMENTS

| 6,938,081 | B1 * | 8/2005 | Mir ............................... 709/223 |
| 7,490,356 | B2 | 2/2009 | Lieblich et al. |
| 2002/0147803 | A1 | 10/2002 | Dodd et al. |
| 2004/0260591 | A1 | 12/2004 | King |
| 2005/0204358 | A1 * | 9/2005 | Hellerstein et al. ............ 718/104 |
| 2006/0020814 | A1 * | 1/2006 | Lieblich et al. ............... 713/182 |
| 2006/0101525 | A1 | 5/2006 | Hiroi et al. |
| 2006/0184410 | A1 * | 8/2006 | Ramamurthy et al. ........... 705/8 |
| 2006/0229926 | A1 * | 10/2006 | Homann et al. ................. 705/9 |
| 2007/0100712 | A1 * | 5/2007 | Kilpatrick et al. .............. 705/29 |
| 2007/0136242 | A1 * | 6/2007 | Auvenshine et al. ............. 707/3 |
| 2009/0031302 | A1 | 1/2009 | Beigi et al. |
| 2009/0276260 | A1 * | 11/2009 | Douglas et al. .................. 705/7 |
| 2010/0191952 | A1 * | 7/2010 | Keinan ......................... 713/100 |

OTHER PUBLICATIONS

Novell Privileged User Manager entitled "Novel Proviledged User Manager: Securely Managing Super User Access", 462-002126-001 Sep. 9, 2009 Novell, Inc.
White Paper, Sep. 2009, Tivoli Software entitled "Realizing business value with mainframe security management".
Security Dark Reading entitled "Symark Launches PowerSeries Management Console for Privileged Access", Jul. 15, 2009, Copyright 2007 CMP Media LLC.
XXCopy Technical Bulleting #42, by Kan Yabumoto, Subject: XXCopy on Windows Vista—living with UAC, Sep. 1, 2007.
NIST National Institute of Standards and Technology, Special Publication 800-30 entitled "Risk Management Guide for Information Technology Systems" by Gary Stonebumer, et al., Jul. 2002.
URL:http://www.highbeam.com/doc/1G1-115310819.html. entitled Article: Reflectent Unveils EdgeSight 3.0:Enabling IT to Reduce Risks of Software Changes; Proactive . . . , Apr. 14, 2004.
Pulse Comes to You entitled "Privileged Identity Management" by Luis Casco-Arias, Tivoli Security, Rish and Compliance Management, 2009.

* cited by examiner

*Primary Examiner* — Chae Ko
(74) *Attorney, Agent, or Firm* — John A. Jordan

(57) ABSTRACT

A system and method of employing a facade to intercept change action commands to be carried out on a target IT endpoint resource. The intercepted commands are compared to information on a corresponding change ticket and any differences, along with the information such as target history, are used to compute a risk assessment of the risk in allowing the intercepted change action commands to be executed. Where the risk exceeds a predetermined threshold, the intercepted change action commands may be modified or eventually aborted.

20 Claims, 2 Drawing Sheets

FACADE FOR BUSINESS RISK MINIMIZATION IN CHANGE ADMINISTRATION VIA RISK ESTIMATION AND MISTAKE IDENTIFICATION BY TICKET ANALYSIS

BACKGROUND OF THE INVENTION

1. Field of the Invention

The present invention relates to minimizing the risks in change actions on managed endpoint resources, such as, managed servers in customer information technology (IT) environments. More particularly, the present invention relates to a system and method that acts to allow system users, such as, system administrators to execute specific changes or tasks on managed IT computer resources with minimization of error.

2. Background and Related Art

In making changes on managed IT computer resource, there are a number of ways in which errors in the change actions or commands executed by users, such as system administrators (SA), can occur. These errors may, for example, be from an error in planning a change for a resource. In addition, human error in executing a change on a resource may occur. Such errors may, for example, result in a wrong command being executed. Or, a command may be executed at the wrong time of day, wrong day or on the wrong server.

The impact of an unintended state change of an IT computer resource due to error in execution of a change command may have major consequences. At a minimum, it may be costly in terms of down time, loss of data, interruption of business transactions, interruption of manufacturing processes, interruption of process management and control, and the like. Obviously, the overall cost in terms of correcting for the error can be very large depending upon the criticality and importance of operations being performed by the system.

Typically, tickets are used in IT systems for system incidents, problems and changes, (IPC tickets). However, change tickets normally do not act to ensure that errors in execution, as described above, will not occur.

SUMMARY OF THE PRESENT INVENTION

In accordance with the present invention, a system and method is provided that addresses the above problems. The invention assists the user, such as a SA, in executing the correct tasks of a change ticket on the correct server at the correct time using the correct command. If the user or SA attempts to execute a change task or command on the wrong server, for example, or at the wrong time (whether time of day or day), or with a wrong command the user or SA is alerted and the task is interrupted for further consideration.

Thus, the system and method in accordance with the present in invention prevents the execution of a wrong command, or execution of a command at the wrong time or the execution of a command on a wrong server. The system and method acts to intercept, in real time, the SA initiated request for change action and further acts to compare the commands of the change action to the corresponding change ticket commands and any ticketing history to estimate the risk associated with the requested change before its actual execution. If the risk is above a given threshold, the system does not allow the SA to proceed with execution of the change until the risk is mitigated or is approved by an IT system expert, for example.

To this end, then, the system and method of the present invention employs a façade arrangement to intercept SA initiated change action commands on endpoint managed computer resources, such as, managed servers in customer IT environments. The facade is used in the IT environment as an interface to the managed computer resources. In addition to intercepting, at runtime, SA initiated change action commands, the façade in accordance with the present invention, includes a component that operates to perform real time logic analysis and risk computation. Thus, the façade accepts the intercepted change action and computes a risk estimate for the action. Where the risk estimate is above a particular threshold, the SA or user initiated change action is not allowed to be executed on the endpoint and the SA or user may resubmit with changes, further assess and compute the risk, or seek approval from a subject matter expert. Risk computation is based upon the change action commands and the information on the current change ticket, as well as ticket history, human expertise, knowledge bases, and the like.

The façade further employs glue code or instructions for authenticating with a ticketing system, accessing information therefrom, and writing to a ticket data base. In addition, a graphical user interface (GUI) allows ticket executers, such as SA's, to interact with the façade system and execute change tickets. An action execution component acts to undertake the change action on the target endpoint computer resource.

It is therefore a general object of the present invention to provide a system and method of managing change actions to be executed on endpoint computer resources to prevent errors in the change action commands on the endpoint computer resources.

In one embodiment of the present invention a method comprising:

intercepting a change action with commands to be performed on endpoint IT environment computer resources;

selecting the change ticket corresponding to the intercepted change action from stored change tickets;

comparing at least the scheduled time of change and target computer resource identified in the change ticket with the intercepted change action commands to determine any differences between the scheduled ticket time and target computer resource identified in the change ticket and the time and server indicated in the intercepted change action commands; and evaluating the risk of carrying out the change action from any differences.

In furtherance of the one embodiment, the method of managing changes to be carried out on endpoint IT environment computer resource wherein the step of comparing includes comparing intercepted change action commands with the corresponding commands in the change ticket to determine any differences for use in evaluating the risk.

In another aspect of the one embodiment, the method of managing changes to be carried out on endpoint IT environment computer resources wherein any difference between the scheduled time of change, target computer resource and change action commands of the interrupted change action and the scheduled time of change, target computer resource and change action commands identified in the change ticket causes a risk evaluation sufficient to not allow the intercepted change action commands to continue.

In a further aspect of the one embodiment, the method of managing changes to be carried out on endpoint IT environment computer resources wherein the step of evaluating the risk includes computing a risk estimate number R to be compared to a threshold number T such that when R is greater than T the intercepted action command is not allowed to continue.

In yet a further aspect of the one embodiment, the method of managing changes to be carried out on endpoint IT environment computer resources wherein R is the product of the probability P that the change action to be carried out is in error and the cost C as an estimate of the cost incurred as a result of carrying out a faulty intercepted change action.

In another aspect of the one embodiment, the method of managing changes to be carried out on endpoint IT environment computer resources including the further step of modifying the intercepted change action for reprocessing.

In yet another aspect of the one embodiment, the method of managing changes to be carried out on endpoint IT environment computer resources wherein the risk number R is determined in response to queries presented to the intercepted change action executer.

In another embodiment of the present invention, a system for managing changes to be carried out on endpoint IT environment computer resources, comprising:

computer resources;

at least one user input terminal for initiating change actions on the computer resources;

a façade arrangement for intercepting change action commands initiated from the user terminal to be performed on the at least one target computer resource of the computer resources, the façade arrangement including;

a graphical user interface arrangement for interfacing with the user and a change ticket data base with the tickets including identification of the specified target computer resource for change and the time of change information;

analysis logic computer components arranged to interface with the graphical user interface to obtain change ticket information to at least compare the scheduled time of change and the target computer resource identified on a change ticket corresponding to intercepted change action commands with the time of change and endpoint computer resource identified in the intercepted change action commands to analyze any differences, a risk computation computer component for computing a risk value of executing the intercepted change action commands using the analyzed differences; and an execution computer component for execution of the change action commands when the risk value is below a predetermined value.

In furtherance of the another embodiment, the system for managing changes to be carried out on endpoint IT environment computer resources wherein the logic analysis computer components compare intercepted change commands with the corresponding commands in the change ticket to analyze any differences to be used in computing the risk value.

In yet a further aspect of the another embodiment, the system for managing changes to be carried out on endpoint IT environment computer resources wherein any differences between the scheduled time of change, target computer resource and change action commands of the intercepted change action and those specified in the corresponding change ticket cause a risk value to be sufficient so as to not allow the intercepted action commands to be executed.

In another aspect of the another embodiment, the system for managing changes to be carried out on endpoint IT environment computer resources wherein the step of computing the risk value includes computing a risk value R to be compared to a threshold value T such that when R is greater than T, the intercepted action commands are not allowed to be executed.

In yet another aspect of the another embodiment, the system for managing changes to be carried out on endpoint IT environment computer resources wherein R is the product of the probability P that the change action to be carried out is in error and the cost C as an estimate of the cost incurred as a result of carrying out faulty intercepted action commands.

In a further aspect of the another embodiment, the system for managing changed to be carried out on endpoint IT environment computer resources wherein faulty intercepted change action commands are interactively analyzed by the change action executer.

In yet another embodiment of the present invention, a computer program product for managing changes to be carried out on endpoint IT environment computer resources comprising, a computer readable storage medium having computer readable program code embodied therein for carrying out the operations of:

intercepting a change action with commands to be performed on endpoint IT environment computer resources;

selecting the change ticket from stored change tickets corresponding to the intercepted change tickets;

comparing at least the scheduled time of change and target computer resource identified in the change ticket with the intercepted change action commands to determine any differences between the scheduled ticket time and target computer resource identified in the change ticket and the time and server indicated in the intercepted change action commands; and evaluating the risk of carrying out the change action from any differences.

In furtherance of the yet another embodiment, the computer program product wherein the operation of comparing includes comparing intercepted change action commands with the corresponding commands in the change ticket to determine any differences for use in evaluating the risk.

In another aspect of the yet another embodiment, the computer program product wherein any difference between the scheduled time of change, target computer resource and change action commands of the interrupted change action and the scheduled time of change, target computer resource and change action commands identified in the change ticket causes a risk evaluation sufficient to not allow the intercepted action commands to continue.

In a further aspect of the yet another embodiment, the computer program product wherein the operation of evaluating risk includes computing a risk estimate number R to be compared to a threshold number T such that when R is greater than T, the intercepted action command is not allowed to continue.

In yet a further aspect of the yet another embodiment, the computer program product wherein R is the product of the probability P that the change action to be carried out is in error and the cost C as an estimate of the cost incurred as a result of carrying out a faulty intercepted change action.

In another aspect of the another embodiment, the computer program product including the further operation of modifying the intercepted change action for reprocessing.

In yet another aspect of the another embodiment, the computer program product wherein the risk number R is determined in response to queries presented to the intercepted change action executer.

DETAILED DESCRIPTION OF THE DRAWINGS

Figure 1:
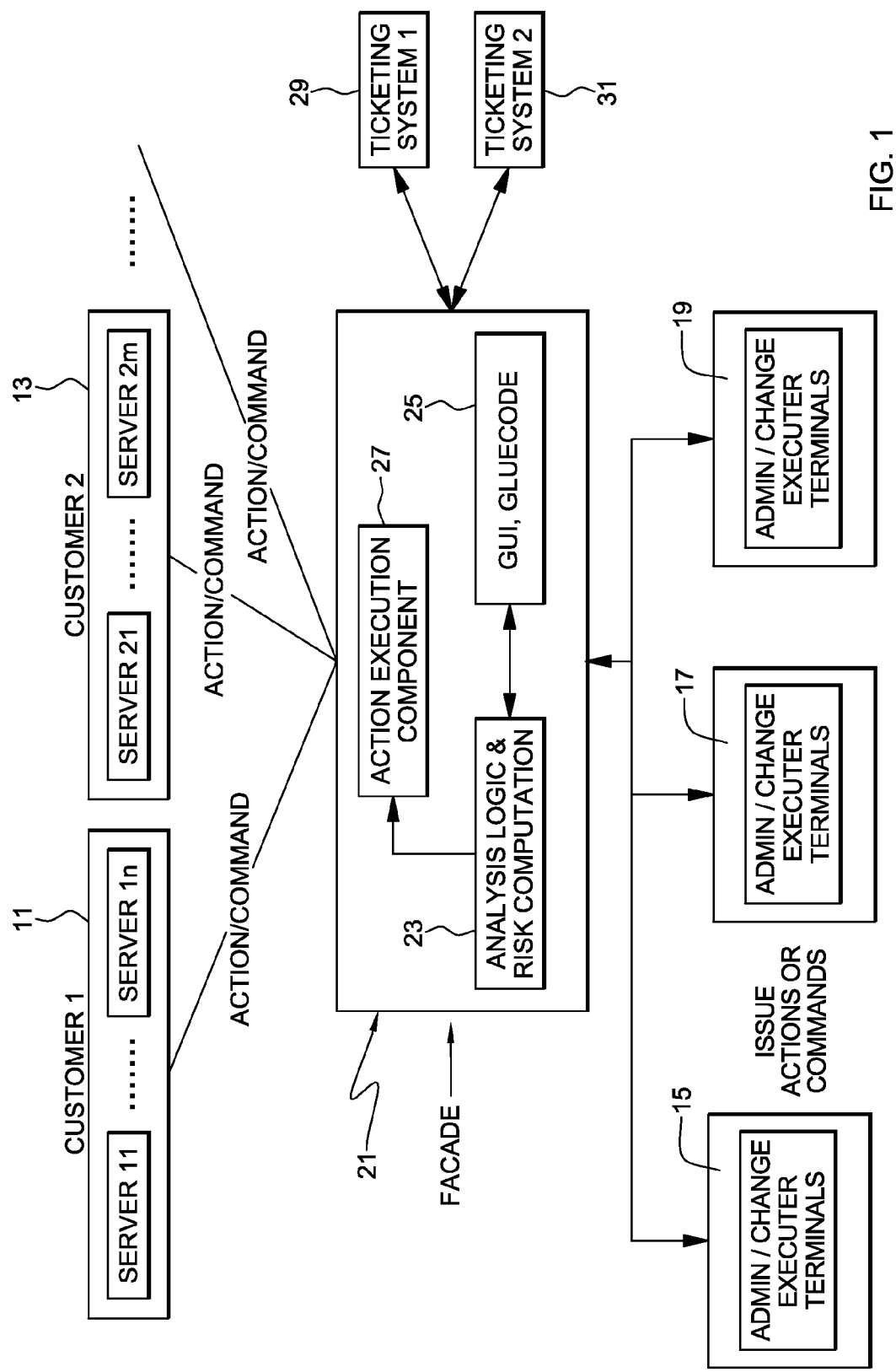
FIG. 1 shows a system diagram for managing changes to be carried out on IT endpoint computer resources, in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Portions of the program code may execute on the user's computer or terminal, and portions on intermediate and/or remote computers or servers. The remote computers may be connected to the intermediate and/or user's computer or terminal through any type of network, including a local area network (LAN) or a wide area network (WAN), or the connection may be made to an external computer (for example, through the Internet using an Internet Service Provider).

Aspects of the present invention are described below with reference to system and flowchart illustrations and/or block diagrams of methods, apparatus (systems) and computer program products according to embodiments of the invention. It will be understood that each block of the flowchart illustration, and combinations of blocks in the flowchart illustrations, can be implemented by computer program instructions. These computer program instructions may be provided to a processor of a general purpose computer, special purpose computer, or other programmable data processing apparatus to produce a machine or system, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or system, other programmable data processing apparatus, or other devices, such as, storage devices, user terminals, or remote computers such as, servers, to function in a particular manner, such that the instructions stored in the computer readable medium produce an article of manufacture including instructions which implement the function/act specified in the flowchart and/or block diagram block or blocks.

The computer program instructions may also be loaded onto a computer or system, other programmable data processing apparatus, or other devices, such as, storage devices, user terminals, or remote computers such as servers, to cause a series of operational steps to be performed on the computer, computer system arrangement and/or other programmable apparatus or other devices to produce a computer implemented process such that the instructions which execute on the computer, computer system arrangement and/or other programmable apparatus provide processes for implementing the functions/acts specified in the flowchart and/or block diagram block or blocks.

Figure 2:
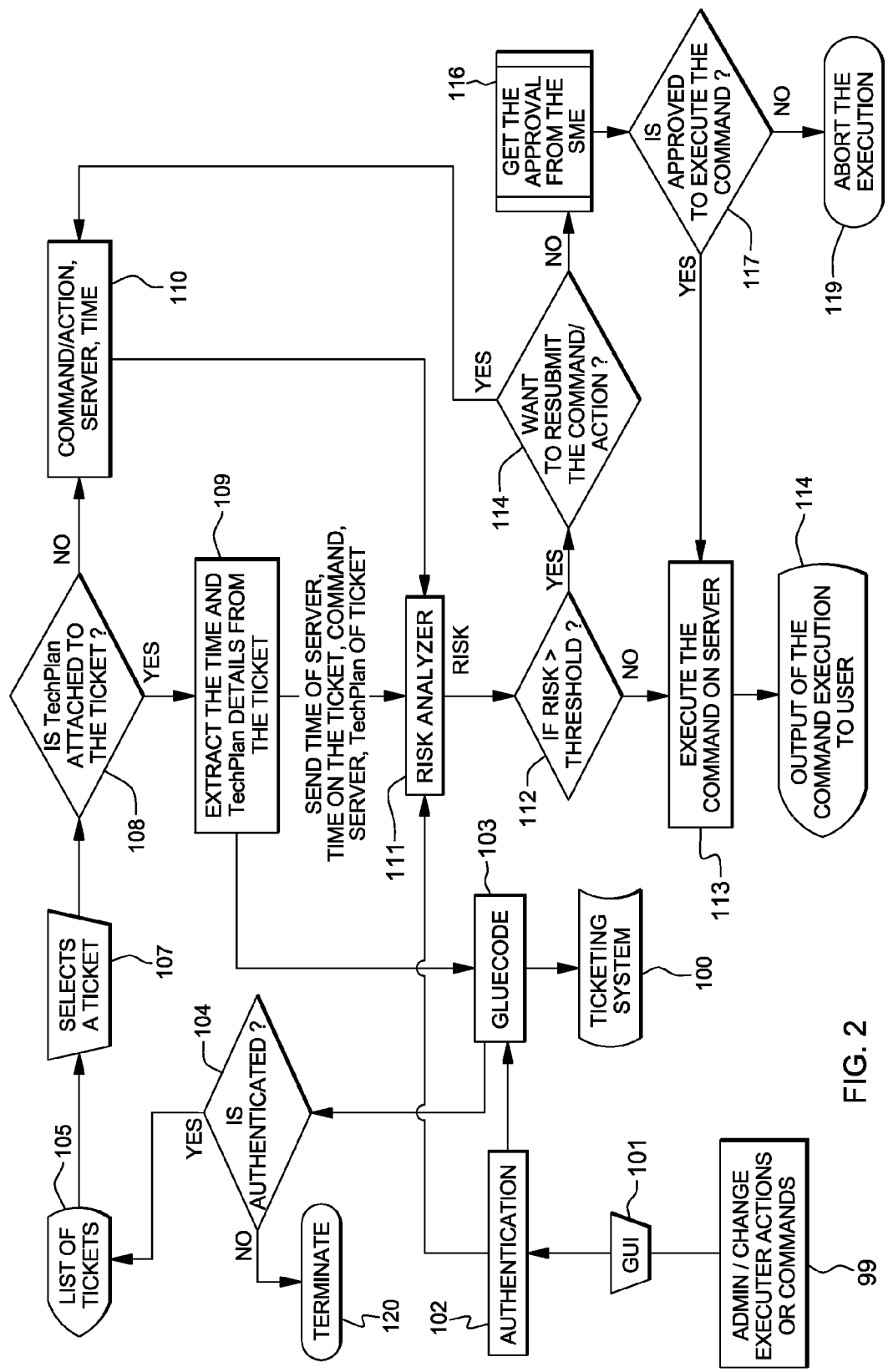
FIG. 2 shows a flow chart depicting the steps of the method of managing changes to be carried out on IT endpoint computer resources, in accordance with the present invention.

The system and flowchart block diagrams in FIGS. 1 and 2, illustrate the architecture, functionality, and operation of possible implementations of systems, methods and computer program products according to various embodiments of the present invention. In this regard, blocks in the system and flowchart block diagrams may represent or embody a processor, circuit module and/or a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the system and flowchart illustration, and combinations of blocks in the system and flowchart illustration, can be implemented by special purpose hardware-based systems that perform the specified functions or acts, or combinations of special purpose hardware and computer instructions.

Referring now to FIG. 1, there is shown a system block diagram arrangement for managing change actions to be carried out on IT endpoint resources. The endpoint resources may be any of a variety of computer resources, such as, computers acting as servers or in any other capacity. Computer resources may also include storage devices and data bases whatever their form. Thus, the term "computer resources" is intended to cover any computer related device, system or machine upon which a change action may be initiated from a remote point, such as a terminal, by a user change or executer, such as, an SA. However, the term "change executer" is intended to mean any person or instrument that may intiate a change action on an endpoint computer resource.

Thus, as shown in FIG. 1, endpoint computer resources are shown for purposes of description as the servers for a plurality of customers, two of which are shown in each of blocks 11 and 13. Admin/change executers are shown in blocks 15, 17 and 19 and typically might be SA's at terminals with displays so as to be able to readily interact with façade 21 positioned between the servers in customer blocks 11 and 13 and terminals 15, 17 and 19. In this regard each customer may have a plurality of servers, as shown, accessed through customer nodes.

Façade 21 acts to intercept change action commands for customer servers 11 and 13 initiated by Admin/change executers, as shown in blocks 15, 17 and 19. For purposes of description here, the initiators of change action commands will be referred to as System Administrators (SA). The façade may be a web application operating on some form of computer, such as a server, positioned between SA's and customer servers. The components of the façade architecture may be developed by using a programmed general purpose computer or may comprise computer components arranged in a special purpose computer arrangement. Available programming tools may also be used to assemble a program package.

As further shown in FIG. 1, façade 21 includes, for purposes of description, analysis logic and risk computation block 23, GUI block 25 and action execution component block 27. GUI block 25 also includes what may be referred to as "glue code", as the term is commonly understood. The glue code may be software or firmware code which undertakes actions for authenticating with the ticketing system and accessing information from and writing to ticketing systems 29 and 31. The ticketing systems include a ticketing data base that includes all relevant information to a ticketing process, such as, ticket number, scheduled start date, scheduled end date, run book or techplan associated with the ticket, and the like. The glue code component of block 25 also interacts with the GUI component to whereby the ticket information is conveyed to analysis logic and risk computation block 23.

The GUI component of block 25 also allows the SA to interact with the façade 21 system and initiate change actions to execute change tickets. The GUI component provides function for intercepting the change action commands initiated by the SA. The intercepted commands are sent to analysis logic and risk computation block 23 where the change action commands are compared to the ticketing information, including commands. The differences between the change action commands and the ticketing information are analyzed and a risk factor or number is computed. It is clear that façade 21 may be implemented in any number of different ways to carry out its function. For example, it may be a programmed computer or a combination of computer hardware and programmed components.

Where the risk number is below an acceptable threshold, the action execution component of block 27 acts to execute the intercepted SA change action commands on the targeted endpoint computer resources, which would be the customer servers shown in FIG. 1. This action execution component of block 27 may be middleware tooling used to access resources and perform actions on the resource. For example, Customer Interaction Management (CIM) software tools might readily be employed in the action execution component of block 27.

With reference to FIG. 2, there is shown a flow chart depicting the process, in accordance with the present invention. The process starts with an SA initiating change action commands at terminal point 99. The GUI acts to allow the SA to log onto the façade system after the authentication step 102 using a user ID and password. After authentication at block 102, the intercepted change action commands of the SA are sent to the risk analyzer of step 111.

The glue code of block 103 acts to access the appropriate ticketing system data base after authentication. The data base is specified by the SA. On specifying the ticketing data base, the glue code accesses all of the tickets identified as pertaining to this SA user. Further authentication for the retrieved tickets is undertaken by the step of block 104.

If the authentication process of block 104 results in failure of authentication, the process is terminated at block 120. If authentication is obtained, the identified tickets are stored in a list as shown by the step of block 105. The SA then selects the appropriate ticket from the list corresponding to the change action commands initiated by the SA. A query is then made as to whether the selected ticket has a runbook or techplan, as shown by the step of block 108. The runbook or techplan sets forth the workflow or set of action commands to be performed. Where a techplan is present for the selected ticket, a view of the techplan may then be displayed at the SA terminal.

As shown at the process step of block 109, the details of the techplan are extracted and sent to the risk analyzer of block 111. The information extracted from the techplan includes, for example, the time on the ticket for change action on the target server, the target sever identified in the ticket for execution of the action, the action or command set forth in the ticket and the techplan for carrying out the action. This information is compared in the risk analyzer process of block 111 with the corresponding information on the intercepted change action commands of the SA.

After comparing the information in the change ticket with the information of the intercepted SA initiated change action commands, the risk analyzer 111 computes a risk factor or number. Available ticket history information may also be used in computing the risk factor. The risk factor is an estimate of the magnitude of the risk in carrying out the intercepted change action commands.

If the risk estimate is greater than some predetermined threshold, then the intercepted change action is halted. The SA may then resubmit the change action to risk analyzer 111, with or without modification, for reprocessing, as shown by the step of blocks 114 and 110. If the SA does not want to resubmit, then, as shown at block 114, the SA may obtain the approval of an SME or system management expert, as shown by block 116. If the SME grants approval as shown by the step of block 117, then the intercepted change action commands are executed, as shown by the step of block 113. The output of the change action commands is then sent to the SA, as shown by block 114. If the SME does not approve the interception change action commands, the execution process is aborted, as shown at block 119.

Where the change ticket does not contain a techplan, as determined at process point 108, the process moves forward without a techplan, as shown by block 110. Such may involve retro changes, for example. Block 110 initiates an instruction to use the change action commands, the target server and time of execution of the change action in a risk evaluation by risk analyzer 111.

After computing the risk factor, which may be given as a number R, it is compared to a threshold number T to determine if the process goes forward. T may be set by system experts and authorities, as appropriate. After a determination at process step 112, the process continues in similar fashion as the case where a techplan is attached to a change ticket.

Risk may be determined by defining risk as follows:
Risk: =1 if $P_{error}$=1 or $C_{error}$=1
Otherwise, Risk: =$P_{error}*C_{error}$ Where $P_{error}$ is defined as the probability that the action to be performed is in error, and $C_{error}$ is defined as the cost incurred as a result of executing an erroneous action.

A threshold T may be defined by the service management based on their experience. If the risk estimate exceeds T then the action is not allowed to be executed. Examples of computation $P_{error}$ are given below:

(1) Wrong Time: If the action being executed is before the scheduled start date of the change ticket, then $P_{error}$ is set to 1. Other rules can be defined that take into account the time aspect and affect the risk of executing an action.

(2) Wrong Server: If the action is executed on a resource (or a server in the managed environment) that is not the target server in the change ticket or the techplan being executed, then $P_{error}$ is set to 1.

(3) Wrong command: If the action to be executed is not the next action to be executed on the techplan, then $P_{error}$ is set to 1. This situation can happen when a user skips one or more commands or actions mentioned in the techplan or forget to specify the right arguments to a command. In general, any situation where the action to be executed is a deviation from what is required to be done with respect to a change ticket.

Using the above values, the risk computation would typically be set between 0 and 1 where the closer the risk is to 1, the higher the chance that the action could lead to an unintended state of the endpoint or system that contains the endpoint. Threshold T, then, would be set between 0 and 1. However, other value schemes may readily be employed.

If the above mentioned examples are not true, then $P_{error}$ and $C_{error}$ are calculated as follows:

(1) Computation of $P_{error}$: Take the available ticket history, e.g. say N tickets. From that ticket history, a subset of all tickets which have been executed unsuccessfully are identified. From this subset, another subset is found where the current action to be executed is related. Let the size of this second subset be E. Then probability of error is defined as $P_{error}$: =E/N 2. Computation of $C_{error}$:

The Analysis Logic and Risk Computation component may ask a series of questions to the SA who is executing the ticket in order to compute an estimate for the $C_{error}$. Two examples of these questions (Q1 and Q2) and their possible answers (A1* and A2*) that the system admin can provide are shown below.

Q1: How many applications will be affected if the change fails?
  A11: 0
  A12: More than 2 but less than 5
  A13: All
Q2: How many users will get affected:
  A21: Less than 10
  A22: More than 10 but less than 100
  A23: Greater than 100

Depending on the answers provided by the SA, a weight is assigned to each question answered. For example, if $W_{Q1}$ is the weight assigned to Q1 then if the SA identifies A11 (or A12 or A13) then $W_{Q1}$ could be defined to be 1 (or 3 or 5), respectively. Next we define how $C_{error}$ is computed from these weights below:

$C_{error}$: $=(W_{Q1}+W_{Q2})/(max(W_{Q1})+max(W_{Q2}))$, where max(.) denotes the maximum possible weight that can be assigned to the Question passed as an argument to it —for example, $max(W_{Q1})$ is 5 based on the above example. The Analysis Logic and Risk Computation component may store this response for this action and resource for future use.

The above procedure may be quickened if the previous feedback history is available. This is how:

(1) Show the questionnaire with default choices estimated from previous history.

Example: estimate weight for Q1 is obtained by averaging the weights of all the answers given to Q1 previously; similarly for Q2. This $C_{error}$ can be estimated based on the estimated default choices of answers.

(2) The SA always has the option to change the answers if the default answer does not seem proper for any of the questions.

(3) The final value of $C_{error}$ can now be calculated by taking an average of the $C_{error}$ obtained from feedback history and that computed based on the select answers from the current questionnaire.

It is clear that other arrangements, parameters and information may be used to determine $P_{error}$ and $C_{error}$. However, where, as defined above, R=1 because of a change action command at the wrong time, or on the wrong server or is a wrong command, it is a critical error in commands setting R=1 which typically would exceed the threshold.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of managing changes to be carried out on endpoint IT environment computer resources, comprising:
    intercepting a change action with commands to be performed on target computer resources;
    selecting the change ticket corresponding to the intercepted change action from stored change tickets;
    comparing at least the scheduled time of change and target computer resource identified in the change ticket with the intercepted change action commands to determine any differences between the scheduled ticket time and target computer resource identified in the change ticket and the time and target computer resource indicated in the intercepted change action commands; and
    evaluating the risk of carrying out the change action from any differences.

2. The method of managing changes to be carried out on endpoint IT environment computer resource as set forth in claim 1 wherein the step of comparing includes comparing an intercepted change action commands with the corresponding commands in the change ticket to determine any differences for use in evaluating the risk.

3. The method of managing changes to be carried out on endpoint IT environment computer resources as set forth in claim 2 wherein any difference between the scheduled time of change, target computer resource and change action commands of the interrupted change action and the scheduled time of change, target computer resource and change action commands identified in the change ticket causes a risk evaluation sufficient to not allow the intercepted change action commands to continue.

4. The method of managing changes to be carried out on endpoint IT environment computer resources, as set forth in claim 3 wherein the step of evaluating the risk includes computing a risk estimate number R to be compared to a threshold number T such that when R is greater than T, the intercepted action command is not allowed to continue.

5. The method of managing changes to be carried out on endpoint IT environment computer resources as set forth in claim 4 wherein R is the product of the probability P that the change action to be carried out is in error and the cost C is an estimate of the cost incurred as a result of carrying out a faulty intercepted change action.

6. The method of managing changes to be carried out on endpoint IT environment computer resources as set forth in claim 5 including the further step of modifying the intercepted change action for reprocessing.

7. The method of managing changes to be carried out on endpoint IT environment computer resources as set forth in claim 5 wherein the risk number R is determined in response to queries presented to the intercepted change action executer.

8. A system for managing changes to be carried out on endpoint IT environment computer resources, comprising:
   computer resources;
   at least one user input terminal for initiating change actions on the computer resources;
   a facade arrangement for intercepting change action commands initiated from said user terminal to be performed on the at least one target computer resource of said computer resources, said facade arrangement including;
   a graphical user interface arrangement for interfacing with said user and a change ticket data base with the tickets including identification of the specified target computer resource for change and the time of change information;
   analysis logic computer components arranged to interface with said graphical user interface to obtain change ticket information to at least compare the scheduled time of change and the target computer resource identified on a change ticket corresponding to intercepted change action commands with the time of change and target computer resource identified in the intercepted change action commands to analyze any differences,
   a risk computation computer component for computing a risk value of executing said intercepted change action commands using the analyzed differences; and
   an execution computer component for execution of the change action commands when the risk value is below a predetermined value.

9. The system for managing changes to be carried out on endpoint IT environment computer resources as set forth in claim 8 wherein the logic analysis computer components compare intercepted change commands with the corresponding commands in the change ticket to analyze any differences to be used in computing the risk value.

10. The system for managing changes to be carried out on endpoint IT environment computer resources as set forth in claim 9 wherein any differences between the scheduled time of change, target computer resource and change action commands of the intercepted change action and those specified in the corresponding change ticket cause a risk value to be sufficient so as to not allow the intercepted action commands to be executed.

11. The system for managing changes to be carried out on endpoint IT environment computer resources as set forth in claim 10 wherein the step of computing the risk value includes computing a risk value R to be compared to a threshold value T such that when R is greater than T, the intercepted action commands are not allowed to be executed.

12. The system for managing changes to be carried out on endpoint IT environment computer resources as set forth in claim 11 wherein R is the product of the probability P that the change action to be carried out is in error and the cost C as an estimate of the cost incurred as a result of carrying out faulty intercepted action commands.

13. The system for managing changed to be carried out on endpoint IT environment computer resources as set forth in claim 12 wherein faulty intercepted change action commands are interactively analyzed by the change action executer.

14. A computer program product for managing changes to be carried out on endpoint IT environment computer resources, the computer program product comprising:
   a computer readable storage medium having computer readable program code embodied therein, the computer readable program code comprising:
   computer readable program code configured to intercept a change action with commands to be performed on target computer resources;
   computer readable program code configured to select the change ticket from stored change tickets corresponding to the intercepted change tickets;
   computer readable program code configured to compare at least the scheduled time of change and target computer resource identified in the change ticket with the intercepted change action commands to determine any differences between the scheduled ticket time and target computer resource of the change ticket and the time and target computer resource indicated in the intercepted change action commands; and
   computer configured program code configured to evaluate the risk of carrying out the change action from any differences.

15. The computer program product as set forth in claim 14 wherein the computer readable program code configured to compare includes comparing the intercepted change action commands with the corresponding commands in the change ticket to determine any differences for use in evaluating the risk.

16. The computer program product as set forth in claim 15 wherein any difference between the scheduled time of change, target computer resource and change action commands of the interrupted change action and the scheduled time of change, target computer resource and change action commands identified in the change ticket causes a risk evaluation sufficient to not allow the intercepted action commands to continue.

17. The computer program product as set forth in claim 16 wherein the computer readable program code configured to evaluate risk includes computing a risk estimate number R to be compared to a threshold number T such that when R is greater than T, the intercepted action command is not allowed to continue.

18. The computer program product as set forth in claim 17 wherein R is the product of the probability P that the change action to be carried out is in error and the cost C as an estimate of the cost incurred as a result of carrying out a faulty intercepted change action.

19. The computer program product as set forth in claim 18 including computer readable program code configured to modify the intercepted change action for reprocessing.

20. The computer program product as set forth in claim 19 wherein the risk number R is determined in response to queries presented to the intercepted change action executer.

* * * * *